United States Patent Office 3,666,511
Patented May 30, 1972

3,666,511
COMBINATION OF A CROSS-LINKED WAXY STARCH AND A CROSS-LINKED NON-WAXY STARCH
Leamon Dale Williams, Palos Heights, and Edward R. Jensen, Hinsdale, Ill., assignor to CPC International Inc.
No Drawing. Continuation-in-part of application Ser. No. 816,021, Apr. 14, 1969. This application Mar. 16, 1970, Ser. No. 20,018
Int. Cl. C08b 25/02
U.S. Cl. 106—210
7 Claims

ABSTRACT OF THE DISCLOSURE

An improved starch material suitable for making puffed, deep fat fried snack products comprising a combination of from about 30% to about 70% of a cross-linked waxy starch with from about 30% to about 70% of a cross-linked non-waxy starch. The non-waxy starch preferably is milo starch, corn starch, or mixtures thereof. Also, a process for producing a puffed, deep fat fried snack product from this improved starch material and the resulting snack product.

---

This application is a continuation-in-part of application, Ser. No. 816,021, filed Apr. 14, 1969 and now abandoned.

This invention covers an improved starch material suitable for making a fat fried snack product, a process for making the snack product, and the snack product itself.

An object of the invention is to provide an improved starch material suitable for making a deep fat dried snack product.

Other objects of the invention will appear hereinafter from the description which follows and from the scope of the appended claims.

GENERAL DESCRIPTION OF THE INVENTION

In its broadest sense, the invention relates to an improved starch material that is suitable for making a puffed, fat fried snack, comprising a combination of from about 30% to about 70% of a cross-linked waxy starch with from about 30% to about 70% of a cross-linked non-waxy starch.

The invention also embraces a process for producing a novel puffed, fat fried snack product. In this process, the improved starch material that is described above is cooked to form a gelatinized paste, shaped articles are formed from the paste; the shaped articles are dehydrated and the dehydrated articles are fried in deep fat, to obtain puffed snack products.

It is essential to the practice of this invention that the improved starch material contain waxy starch and a non-waxy starch in the proportion as specified. When these proportions are adhered to, the resulting product is puffy and, in the absence of added flavors, bland tasting. The non-waxy starch contains less than 50% amylose and preferably is milo starch, corn starch, tapioca or mixtures thereof.

Bland taste is an extremely desirable characteristic, since the natural flavor of the material will not interfere with an added flavor. When the starch material of the present invention is used, puffed snacks can be produced that have any desired flavor, by adding a selected flavor to the initial raw batch material.

When a waxy starch is used, in accordance with the invention, in conjunction with either milo starch, corn starch, or a mixture of milo and corn starches, the resulting starch material after conversion into fried snacks will be bland tasting. Preferably, the waxy starch is used in conjunction with milo starch. This combination produces very bland-tasting fried snacks.

Another desirable characteristic of a fried snack is that the fried snack should puff upon frying. Snacks made in accordance with the present invention are quite voluminous and puffy by comparison with the shaped articles from which they are produced. The degree of swelling can be controlled by controlling the ratio of waxy starch to non-waxy starch. The use of more waxy starch in the blend increased the degree of puffing.

Preferably, the starch material has a Scott viscosity of from about 10 grams to about 23 grams. That is, a 100 ml. portion of a solution of 280 ml. volume containing from 10 grams to 23 grams of the starch material, dry basis, will flow from a standard Scott apparatus in from 20 seconds to 70 seconds. This Scott viscosity is imparted to the material by cross-linking both the waxy starch and the non-waxy starch with a cross-linking agent.

Typical cross-linking agents which may be used to attain this Scott viscosity include alkali metal trimetaphosphates, such as sodium trimetaphosphate, and potassium trimetaphosphate, and anhydrides of organic acids such as acetic anhydride, succinic anhydride, maleic anhydride, and the like. The preferred cross-linking agent is sodium trimetaphosphate.

The starch material preferably has a moisture content of from about 7% to about 15%.

The cross-linking may be attained by either first individually cross-linking the waxy starch and the non-waxy starch and then forming the improved starch material or by first formulating a combination of non-cross-linked waxy starch and non-cross-linked non-waxy starch and then cross-linking the combination. In either case, the Scott viscosity discussed previously refers to the overall Scott viscosity of the starch material.

In a preferred procedure, the starch material is formed into a gelatinized paste by mixing an aqueous liquid with the starch material to form a moist composition, and then pasting and gelatinizing the moist composition by simultaneous application of heat, pressure and agitation to form a gelatinized shapeable paste. Preferably, the agitation is of the shearing type.

In a second preferred procedure the starch material may be pregelatinized at atmospheric pressure by heating a slurry of the starch material to above the gelatinization temperature of the material. The gelatinized starch material is then separated from the slurry and dried by conventional techniques, for example, spray drying, filtration followed by air drying, or the like. Alternatively, the waxy starch and the non-waxy starch may be individually pregelatinized and then blended to form the pregelatinized starch material.

On later addition of water the dried pregelatinized starch material forms a gelatinized shapeable paste.

Up to about 10% by weight of potato starch may be added to the starch material, the percentage being based on total starch material weight. The potato starch increases somewhat the puffiness of the snack product obtainable from the starch material.

Preferably, the gelatinized paste contains from about 10% to about 25% by weight of an aqueous liquid, based on the weight of the improved starch material.

By the term shapeable paste we mean a paste that may be converted into shaped articles whereby the shaped articles will retain their shape.

The shapeable paste is formed into shaped articles, for example, rings, chips, triangles, and the like.

In one preferred embodiment of the process of the invention, the shaped articles are dehydrated at a relatively low temperature from about 70° F. to about 120°

F. The moisture content of the shaped articles after dehydrating is preferably from about 10% to about 18% and more preferably from about 10% to about 14%.

In a second preferred embodiment of the process of the invention, the shaped articles are first dehydrated at the relatively low temperature to a moisture content of 15% to 21% and then further dehydrated and simultaneously smoothed by being heated to a higher temperature falling within the range from about 212° F. to about 300° F. The shaped articles are preferably maintained at this higher temperature for from about 2 minutes to about 5 minutes. After the further dehydration step the shaped articles preferably have a moisture content of from about 13% to about 19%.

The two-step dehydrating process described immediately above provides shaped articles which produce puffed articles after deep frying that are highly improved, in that the puffed articles exhibit a smoother surface and may therefore for longer periods of time without excessive crumbling or break-up occurring, and in that they absorb less oil. The improvement occurs when frying quickly follows drying.

Preferably, the deep fat frying step used in the practice of the invention consists of heating the shaped articles in deep fat at a temperature of from about 350° F. to about 425° F. for a time preferably falling within the range from about 15 seconds to about 90 seconds. The deep fat may be any edible vegetable or animal oil or fat, for example, corn oil, sunflowerseed oil, lard and the like.

Salt, flavoring materials, and the like may be added to the paste or to the puffed snack product to produce desirable tastes such as onion flavor, garlic flavor, and the like.

In a preferred embodiment, from about 2% to about 7% by weight of a liquid shortening and from about 0.2% to about 1% by weight of a monoglyceride, the percentage figures being based on the weight of the starch material, are added to the improved starch material before the aqueous liquid is added to form the moist composition. Most preferably, from about 3% to about 5% by weight of the liquid shortening and from about 0.2% to about 0.35% by weight of a monoglyceride is added to the improved starch material. Typical usable monoglycerides include glyceryl monostearate, glyceryl monooleate, and the like.

Coloring material may also be added to either the improved starch material or to the moist composition resulting from mixing the improved starch material with an aqueous liquid. This will allow the production of colored puffed deep fat fried snack products of improved and pleasing appearance. Coloring materials may also be added to the fried snacks. For example, orange coloring material can be added to produce an orange colored snack product. Cheese flavoring can be added to the same fried snack product. The resulting product will exhibit approximately the color and taste of cheese.

The aqueous liquid which is mixed with the starch material to form the moist composition may be water or water having dissolved therein seasoning and coloring materials. Typical seasoning materials which may be dissolved in the aqueous liquid include salts such as sodium chloride, potassium nitrate, and potassium nitrite and as well, soluble spices that are stable under the process conditions. These materials will lead to an altered flavor in the snack product produced in accordance with the invention.

The invention may be further understood by reference to the examples which follow. The examples are meant to be illustrative only and the invention, of course, is not to be limited thereto. All percentage figures in the examples and elsewhere in this application are by weight unless specifically stated to be otherwise.

EXAMPLE I

Formulation and evaluation of puffed rings

A series of ten starch blends were formulated, using the proportions of different starches shown below in Table I.

Each of the blends was then converted into fat fried snacks using the following procedure.

Each blend of starch was separately mixed, respectively, with 3.76% liquid shortening (a highly stable hydrogenated and winterized cottonseed oil-soybean oil blend) and 0.26% of glyceryl monostearate. Water, 15.59% based on the total blend weight, was added.

The resulting wet dough was then fed into a Wenger Model X-25 Continuous Extruder Cooker where it was heated to 300° F. while under a pressure of from about 200 p.s.i. to about 500 p.s.i. It was simultaneously sheared and agitated by passage through this screw-type extruder, which has a 5 inch diameter shaft and screw. The resulting gelatinized starch paste left the extruder in the form of a rope.

The rope was fed into a Wenger Forming Extruder. The forming extruder was maintained at a temperature of approximately 200° F. In the forming extruder the gelatinized starch paste was passed through a 5 inch diameter screw type extruder section, to remove entrapped air and to compact the gelatinized paste.

At the extruder discharge nozzle, the gelatinized paste was forced through shaping dies and was cut into the shape of rings. The rings were dried at room temperature (70° F.-120° F.) for a measured time period and then were deep fat fried at 390° F. for 45 seconds.

The percentages of moisture in the rings after 1 hour and 7 hours of drying, respectively, but prior to cooking, was determined. In addition, the specific volumes of the fried rings and the percentages of fat absorbed by the rings on frying was measured. The surface smoothness of the fried rings was rated by visual observation. Table I summarizes the results of this testing.

TABLE I

| Starch blend, 50/50 mixture | Hours dried | Moisture, percent | Fat absorbed, percent | Specific volume, ml./g. | Surface evaluation* |
|---|---|---|---|---|---|
| 14 g. Scott, waxy and non-waxy milo | 1 | 15.98 | 36.7 | 2.72 | 2-3 |
|  | 7 | 10.67 | 21.7 | 3.40 | 1 |
| 17 g. Scott, waxy and non-waxy milo | 1 | 16.83 | 40.6 | 3.02 | 2-3 |
|  | 7 | 10.84 | 26.3 | 3.23 | 1 |
| 20 g. Scott, waxy and non-waxy milo | 1 | 17.60 | 38.2 | 3.56 | 4-3 |
|  | 7 | 12.25 | 35.0 | 3.77 | 1 |
| 22 g. Scott, waxy and non-waxy milo | 1 | 19.66 | 24.4 | 3.33 | 4 |
|  | 7 | 12.50 | 33.8 | 3.70 | 1-2 |
| 13 g. Scott waxy milo and 14 g. Scott non-waxy milo | 1 | 16.60 | 37.9 | 4.31 | 3 |
|  | 7 | 11.66 | 33.3 | 4.27 | 1 |
| 12 g. Scott waxy milo and 17 g. Scott non-waxy milo | 1 | 15.56 | 39.3 | 4.00 | 2-3 |
|  | 7 | 11.47 | 28.0 | 4.00 | 1 |
| 12 g. Scott waxy milo and 23 g. Scott non-waxy milo | 1 | 17.47 | 27.6 | 3.54 | 4-3 |
|  | 7 | 12.02 | 35.4 | 3.94 | 1 |
| 14 g. Scott, waxy and non-waxy milo, and 4% potato | 1 | 17.05 | 40.5 | 3.56 | 4-3 |
|  | 7 | 11.00 | 28.3 | 3.21 | 1 |
| 22 g. Scott, waxy and non-waxy milo, and 4% potato | 1 | 16.27 | 34.0 | 3.66 | 3 |
|  | 7 | 11.83 | 28.2 | 3.72 | 1 |
| 12 g. Scott waxy milo, 17 g. Scott non-waxy milo, and 4% potato | 1 | 18.22 | 34.1 | 2.90 | 3 |
|  | 7 | 11.70 | 34.2 | 3.95 | 1 |

*1=smooth; 2=moderately smooth; 3=moderately rough; 4=rough.

Blends of waxy corn starch and non-waxy corn starch, and of waxy corn starch and non-waxy milo starch give similarly good fried snacks.

The data indicate that puffed deep fat fried snacks can be produced by the method of the invention from blends of waxy and non-waxy starches of different Scott viscosities. Also indicated is the advisability of drying the extruded shaped snack items prior to deep fat frying to obtain better surface characteristics in the final deep fat fried product.

The waxy starches and non-waxy starches of different viscosities were obtained by cross-linking the respective starches with sodium trimetaphosphate.

The deep fat fried snack products produced as described above, were very bland in flavor.

The effect of using a second and different drying procedure upon each of the ten blends was also determined. The second drying procedure used was as follows.

Rings produced from each of the ten blends were dried to a moisture content of from 17% to 21% at room temperature (70° F.–120° F.). The rings from each blend were then further dried at 250° F. for four minutes. The moisture contents of the rings from each blend both before and after the 250° F. treatment were measured. The percentages of fat absorbed on frying and the specific volume after frying of each set of rings were determined. Table II summarizes the results of this testing.

TABLE II

| Starch blend, 50/50 mixture | Moisture, percent | | Fat absorbed percent | Specific volume, ml./g. |
|---|---|---|---|---|
| | Before 250° F. drying* | After 250° F. drying | | |
| 14 g. Scott, waxy and non-waxy milo | 18.1 | 15.4 | 25.9 | 2.98 |
| 17 g. Scott, waxy and non-waxy milo | 20.7 | 18.0 | 28.1 | 3.00 |
| 20 g. Scott, waxy and non-waxy milo | 18.3 | 16.1 | 19.7 | 4.62 |
| 22 g. Scott, waxy and non-waxy milo | 19.3 | 18.0 | 17.4 | 3.42 |
| 13 g. Scott, waxy milo and 14 g. Scott non-waxy milo | 18.2 | 16.9 | 25.0 | 5.32 |
| 12 g. Scott waxy milo and 17 g. Scott non-waxy milo | 17.7 | 15.0 | 21.9 | 4.07 |
| 12 g. waxy milo and 23 g. Scott non-waxy milo | 17.1 | 15.3 | 13.6 | 3.62 |
| 14 g. Scott waxy and non-waxy milo and 4% potato | 18.7 | 16.5 | 29.6 | 4.32 |
| 22 g. Scott, waxy and non-waxy milo and 4% potato | 18.8 | 16.4 | 25.9 | 3.92 |
| 12 g. Scott waxy milo, 17 g. Scott non-waxy milo, and 4% potato | 16.8 | 14.7 | 17.4 | 4.51 |

*1 hour drying at room temperature (70° F.–120 F.°).

The data indicate that short time drying at 250° F. is effective in reducing the amount of absorbed fat and usually increasing the specific volume of the puffed deep fat fried snack products.

EXAMPLE 2

Puffed deep fat fried snacks from corn starch

Puffed deep fat fried snack products were produced as described in Example 1 utilizing a 50/50 mixture of waxy milo starch with corn starch.

The snacks produced absorbed 22.6% fat and had a specific volume of 3.31 ml./g. They were relatively bland tasting but were not quite as bland tasting as were the waxy milo—non-waxy milo starch based snacks produced as described in Example 1.

Conclusion

The production of puffed deep fat fried snacks from blends of readily available waxy milo starch or waxy corn starch, and non-waxy milo and corn starches has been demonstrated. Snacks produced in this manner are bland tasting and may be used in conjunction with extraneous flavoring materials to produce snack products which exhibit only the flavor of the extraneously added flavoring materials.

While the invention has been described in connection with specific embodiments thereof, it will be understood that it is capable of further modifications, and this application is intended to cover any variations, uses, or adaptations, of the invention following, in general, the principles of the invention and including such departures from the present disclosure as come within known or customary practice in the art to which the invention pertains and as may be applied to the essential features hereinbefore set forth, and as fall within the scope of the invention.

We claim:

1. An improved starch product suitable for making a puffed, fried snack comprising:
   a combination of from about 30% to about 70% by weight of a cross-linked waxy starch with from about 30% to about 70% by weight of a cross-linked non-waxy starch.

2. The starch product of claim 1 further characterized in that the cross-linking is sufficient to provide the improved starch product with a Scott viscosity of from about 10 grams to about 23 grams in from 20 seconds to 70 seconds.

3. The starch product of claim 2 wherein the cross-linking is attained by first mixing together the waxy starch and the non-waxy starch, and then reacting the combination with an alkali metal trimetaphosphate.

4. The starch product of claim 2 wherein the cross-linking is attained by separately cross-linking the waxy starch and the non-waxy starch with an alkali metal trimetaphosphate, and then forming the combination.

5. The starch product of claim 1 wherein the non-waxy starch is a milo starch.

6. The starch product of claim 1 wherein the non-waxy starch is a corn starch.

7. The starch product of claim 1 wherein the waxy starch is a corn starch.

References Cited

UNITED STATES PATENTS

| 3,376,286 | 4/1968 | Germino et al. | 260—233.5 |
| 2,938,901 | 5/1960 | Kerr et al. | 260—233.5 |
| 2,801,242 | 7/1957 | Kerr et al. | 260—233.5 |
| 3,238,193 | 3/1966 | Tuschhoff et al. | 260—233.5 |

OTHER REFERENCES

Deatherage et al., Transactions, American Association of Cereal Chemists, vol. 13, pp. 31–42 (1955).

Whister et al., Starch, Chemistry and Technology, vol. I, pp. 253–255, 1965.

Radley, Starch and Its Derivatives (1968), pp. 26–32, Clay, Ltd., London.

DONALD E. CZAJA, Primary Examiner

M. I. MARQUIS, Assistant Examiner

U.S. Cl. X.R.

99—1, 81, 83, 139; 260—233.3 R, 233.5